(12) United States Patent
Ohashi

(10) Patent No.: US 8,890,390 B2
(45) Date of Patent: Nov. 18, 2014

(54) VIBRATION-WAVE DRIVING DEVICE, TWO-DIMENSIONAL DRIVING APPARATUS, AND IMAGE-SHAKE CORRECTING APPARATUS

(71) Applicant: Canon Kabushiki Kaisha, Tokyo (JP)

(72) Inventor: Kaishi Ohashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 28 days.

(21) Appl. No.: 13/933,930

(22) Filed: Jul. 2, 2013

(65) Prior Publication Data

US 2013/0293728 A1    Nov. 7, 2013

Related U.S. Application Data

(63) Continuation of application No. PCT/JP2013/050266, filed on Jan. 10, 2013.

(30) Foreign Application Priority Data

Jan. 31, 2012   (JP) .................................. 2012-017651

(51) Int. Cl.
| | | |
|---|---|---|
| *H01L 41/00* | (2013.01) | |
| *H02N 2/04* | (2006.01) | |
| *G03B 5/00* | (2006.01) | |
| *H02N 2/00* | (2006.01) | |

(52) U.S. Cl.
CPC .. *H02N 2/04* (2013.01); *G03B 5/00* (2013.01); *H02N 2/0015* (2013.01)
USPC ............. 310/323.01; 310/323.03; 310/323.06

(58) Field of Classification Search
USPC ............. 310/323.01, 323.03, 323.06, 316.01, 310/316.02, 317–319
See application file for complete search history.

(56) References Cited

U.S. PATENT DOCUMENTS

| | | | |
|---|---|---|---|
| 7,034,438 B2 * | 4/2006 | Ohashi et al. ............. | 310/323.13 |
| 7,432,633 B2 * | 10/2008 | Sakano ..................... | 310/323.02 |
| 8,164,233 B2 * | 4/2012 | Mukae ..................... | 310/323.01 |
| 2006/0279638 A1 * | 12/2006 | Matsuda et al. ........... | 348/208.7 |
| 2009/0230818 A1 * | 9/2009 | Mukae et al. ............. | 310/323.16 |
| 2011/0001391 A1 * | 1/2011 | Mukae ..................... | 310/311 |

FOREIGN PATENT DOCUMENTS

| | | |
|---|---|---|
| JP | 2007-025164 A | 2/2007 |
| JP | 3911936 B2 | 5/2007 |
| JP | 2008-067479 A | 3/2008 |
| JP | 2008-304850 A | 12/2008 |
| JP | 2009-031353 A | 2/2009 |

* cited by examiner

*Primary Examiner* — Eduardoo Colon Santana
*Assistant Examiner* — Bickey Dhakal
(74) *Attorney, Agent, or Firm* — Canon USA Inc IP Division

(57) ABSTRACT

A vibration-wave driving device includes a vibrator having an electromechanical-energy converting element, and a moving mechanism configured to allow the vibrator to move relative to a movable body, in a plane parallel to a plane where the vibrator and the movable body are in contact, in a second direction intersecting with a first direction being a direction of a driving force produced by the vibrator. The moving mechanism includes a guide member that regulates a moving direction of the vibrator, and the guide member includes a member having a rollable curved portion.

8 Claims, 16 Drawing Sheets

VIBRATION-WAVE DRIVING DEVICE, TWO-DIMENSIONAL DRIVING APPARATUS, AND IMAGE-SHAKE CORRECTING APPARATUS

CROSS-REFERENCE TO RELATED APPLICATIONS

This application is a Continuation of International Patent Application No. PCT/JP2013/050266, filed Jan. 10, 2013, which claims the benefit of Japanese Patent Application No. 2012-017651, filed Jan. 31, 2012, both of which are hereby incorporated by reference herein in their entirety.

TECHNICAL FIELD

The present disclosure relates to a vibration-wave driving device, a two-dimensional driving apparatus, and an image-shake correcting apparatus.

BACKGROUND ART

Many vibration-wave driving devices have been proposed, which excite a vibration in a vibrator and move a movable body pressed in contact with the vibrator.

Such vibration-wave driving devices are regarded as important functional components in optical apparatuses that are required to perform particularly precise operation. For example, there is a two-dimensional driving apparatus, which is used as an image-shake correcting apparatus, in which a plurality of linear vibration-wave driving devices (capable of linearly moving a movable body) are arranged to combine their driving operations to move the movable body in different directions in two-dimensional space (see PTL 1 and PTL 2).

However, when the driving operations of the vibration-wave driving devices are combined, the moving direction of the movable body and the driving direction of any of the vibration-wave driving devices may intersect at right angles or at substantially right angles, depending on, for example, the moving direction of the movable body.

In this case, the vibration-wave driving that intersects with the moving direction at right angles or at substantially right angles is unable to contribute to driving the movable body. Additionally, a frictional force produced by contact between the movable body and the vibration-wave driving device causes a load on movement of the movable body. This leads to an energy loss, and results in an output loss.

As a driving device other than the vibration-wave driving device, there is a non-contact driving device, such as a voice coil motor, which is capable of transmitting the displacement or driving force to a movable body without contact. It is possible to realize a two-dimensional driving apparatus in which a non-contact driving device and a vibration-wave driving device are arranged to have different driving directions so as to move a movable body in different directions in two-dimensional space.

However, when the non-contact driving device tries to drive the movable body, a frictional force produced by contact between the vibration-wave driving device and the movable body causes a load on movement of the movable body.

When a contact driving device which is not a vibration-wave driving device is used in combination with a vibration-wave driving device, a load on movement of the movable body also occurs.

This means that if, for example, the vibration-wave driving devices described above are used as driving devices for an image-shake correcting apparatus, the performance of the image-shake correcting apparatus may be degraded.

To address the problems described above, PTL 1 and PTL 2 propose techniques in which an output loss is reduced by exciting a vibration in the vibration-wave driving device in a pressure direction with respect to the movable body so as to reduce a frictional force.

CITATION LIST

Patent Literature

PTL 1 Japanese Patent Laid-Open No. 2009-031353
PTL 2 Japanese Patent No. 03911936

SUMMARY OF THE INVENTION

However, in the related art described above, when driving operations of the plurality of vibration-wave driving devices are combined, the techniques for reducing an output loss in the vibration-wave driving device that does not contribute to driving the movable body have the following problems.

That is, the techniques for reducing an output loss in the related art can reduce an output loss. However, a large amount of power is required as electric energy for exciting a vibration in the vibration-wave driving device, which does not contribute to movement of the movable body, in the pressure direction with respect to the movable body.

Also, unless the magnitude of vibration in the pressure direction with respect to the movable body is greater than a certain level, it is difficult to effectively reduce the output loss. Therefore, since it is necessary to produce a vibration having an amplitude greater than a certain value, a large amount of power is required.

A large amount of power is also required when a non-contact driving device is used in combination with a vibration-wave driving device, or when a contact driving device which is not a vibration-wave driving device is used in combination with a vibration-wave driving device.

One aspect of the present invention is related to a vibration-wave driving device, a two-dimensional driving apparatus, and an image-shake correcting apparatus that can, when a movable body is moved in different directions in two-dimensional space using at least one vibration-wave driving device, reduce an output loss caused by a vibration-wave driving device that does not contribute to the movement of the movable body, and be driven without causing an increase in power consumption.

A vibration-wave driving device according to one aspect of the present invention includes a vibrator having an electromechanical-energy converting element, and a moving mechanism configured to allow the vibrator to move relative to a movable body, in a plane parallel to a plane where the vibrator and the movable body are in contact, in a second direction intersecting with a first direction being a direction of a driving force produced by the vibrator.

A two-dimensional driving apparatus according to one aspect of the present invention includes at least the vibration-wave driving device described above, a driving device having a driving force in a direction intersecting with the first direction, and a movable body. The movable body is two-dimensionally moved by the vibration-wave driving device and the driving device.

An image-shake correcting apparatus according to one aspect of the present invention includes the vibration-wave driving device described above, an optical lens or an image pickup element, a control device, and a power supply.

Further features of the present invention will become apparent from the following description of exemplary embodiments with reference to the attached drawings.

DESCRIPTION OF EMBODIMENTS

Figure 1:
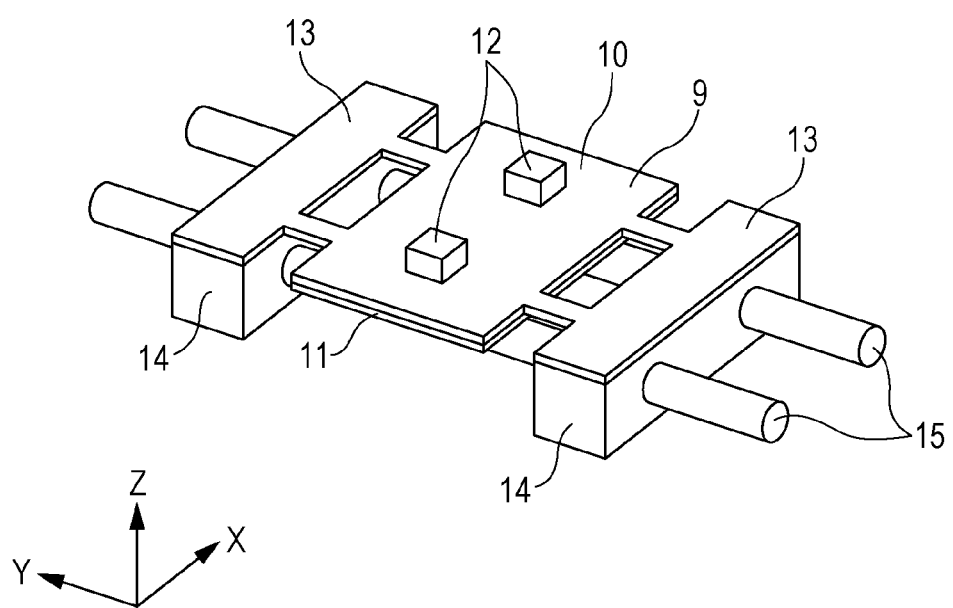
FIG. 1 is a perspective view illustrating a configuration of a vibration-wave driving device according to Example 1 of the present invention.

Embodiments of the present invention will now be described.

A vibration-wave driving device according to the present embodiment includes a vibrator having an electromechanical-energy converting element, and a supporting member configured to support the vibrator. The vibration-wave driving device excites a vibration in the vibrator, and causes a movable body in contact with the vibrator to move with a frictional force.

The vibration-wave driving device includes a moving mechanism configured to allow the vibrator to move in a second direction that intersects with a first direction (which is a direction of a driving force produced by the vibrator, and is the same direction as a feed direction described below with reference to FIGS. 4A and 4B).

In the present invention, a "plane where the vibrator and the movable body are in contact" refers to a virtual plane containing a plurality of contact points where the vibrator and the movable body are in contact.

A "plane parallel to the plane where the vibrator and the movable body are in contact" refers to a virtual plane parallel to the virtual "plane where the vibrator and the movable body are in contact" described above, and there are an infinite number of such planes.

These planes are specified to clearly define the first direction and the second direction.

In the present invention, the first direction refers to a direction of a driving force produced by the vibrator (provisionally referred to as a "first vibrator") to move the movable body, and is also referred to as a driving direction (which is the same as a feed direction described below with reference to FIGS. 4A and 4B). The second direction refers to a direction that intersects with the first direction.

When the first vibrator produces no driving force and the movable body moves in a direction of a driving force (second direction) produced by a vibrator different from the first vibrator (or by a driving device other than the vibration-wave driving device), the first vibrator is moved by the moving mechanism in the second direction. That is, when the movable body moves in the second direction different from the driving direction of the first vibrator (first direction), the first vibrator moves in the second direction.

In this case, although a force is exerted on the first vibrator in the second direction by a vibrator other than the first vibrator (or by a driving device other than the vibration-wave driving device), the first vibrator does not resist the exerted force and is moved by the moving mechanism in the second direction (i.e., the first vibrator avoids the exerted force). That is, the second direction is a direction in which the vibrator can be moved by the moving mechanism, and is also referred to as an "avoidance direction".

Conversely, when the movable body is moved by a driving force produced by the first vibrator, a vibrator other than the first vibrator is moved by the moving mechanism in the moving direction of the movable body in accordance with the movement of the movable body.

In the present invention, the configuration of the moving mechanism which allows movement in the second direction (and allows substantially no movement in the first direction) can be realized by providing a guide member movable only in the second direction.

The configuration of the moving mechanism described above can also be realized when a vibrator is supported by an elastic member (typically a spring member) configured to be easily displaced only in a specific direction.

In the present invention, a state where there is "the second direction intersecting with the first direction" refers to a state where there is a component of a direction different from the first direction (i.e., a state where a force for movement in a direction different from the first direction is produced).

Such a state where a force for movement in a direction different from the first direction is produced may cause an output loss as described above.

Typically, an output loss is most likely to occur when the first direction and the second direction intersect at angles of 90°. Even if the angle of intersection is small, the corresponding output loss may occur.

A vibrator of the present invention includes a vibrating plate (also referred to as a vibrating body) and an electromechanical-energy converting element (typically a piezoelectric ceramic). A desired vibration can be excited by applying a predetermined electric field to the electromechanical-energy converting element.

In the present invention, a linear vibration-wave driving device refers to a vibration-wave driving device capable of linearly moving a movable body.

Each linear vibration-wave driving device is configured to linearly move a movable body (also referred to as a driven body). When a plurality of linear vibration-wave driving devices are used in combination, the movable body can be moved in a desired direction.

EXAMPLES

Examples of the present invention will now be described. The present invention is by no means limited to the examples described below.

Example 1

Example 1 will describe a camera as an image pickup apparatus to which the present invention is applied.

Figure 3:
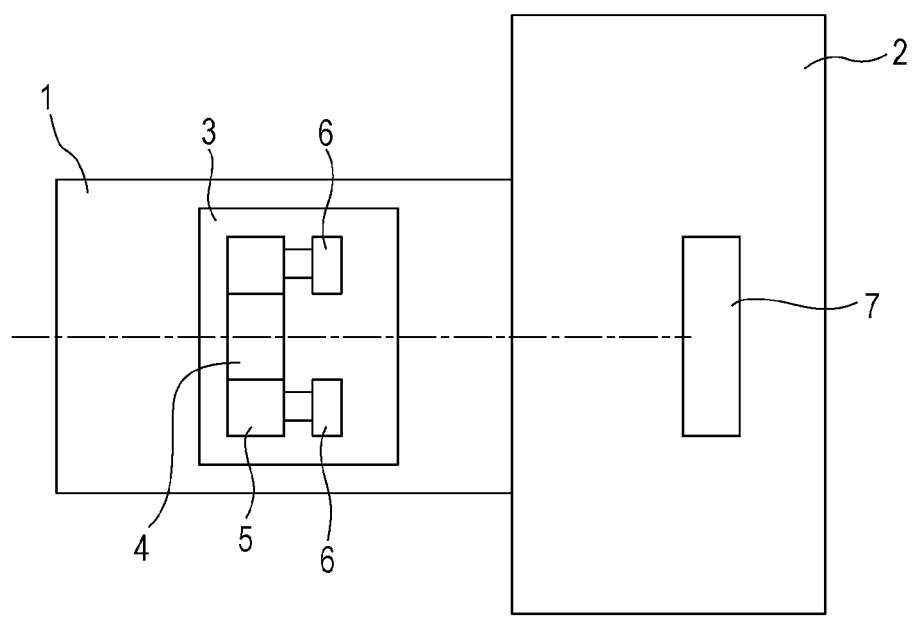
FIG. 3 is a cross-sectional view illustrating a camera serving as an image pickup apparatus according to Example 1 of the present invention.

FIG. 3 is a cross-sectional view illustrating a configuration of a camera having a function of taking still and moving images according to the present example.

In FIG. 3, reference numeral 1 denotes a lens barrel, reference numeral 2 denotes a camera body, and reference numeral 3 denotes an image-shake correcting apparatus which is a two-dimensional driving apparatus included in the lens barrel 1.

The image-shake correcting apparatus 3 includes at least an optical lens 4, a movable body 5 that holds the optical lens 4, and vibration-wave driving devices 6 that move the movable body 5.

Although not shown in FIG. 3, the lens barrel 1 may include an optical system other than the optical lens 4, an acceleration sensor that detects a shake of the lens barrel 1, and an encoder that detects a two-dimensional movement of the movable body.

The lens barrel 1 may further include a power supply that supplies electrical energy to the vibration-wave driving devices 6, and a control device that includes a control mechanism for operating the power supply by processing a signal output from the acceleration sensor and a signal output from the encoder.

The camera body 2 includes an image pickup element 7. Light from an object passes through the optical system including the optical lens 4 in the lens barrel 1, and is incident on the image pickup element 7 in the camera body 2.

On the basis of a signal from the acceleration sensor, the image-shake correcting apparatus 3 moves the optical lens 4 to correct an image shake.

Figure 2:
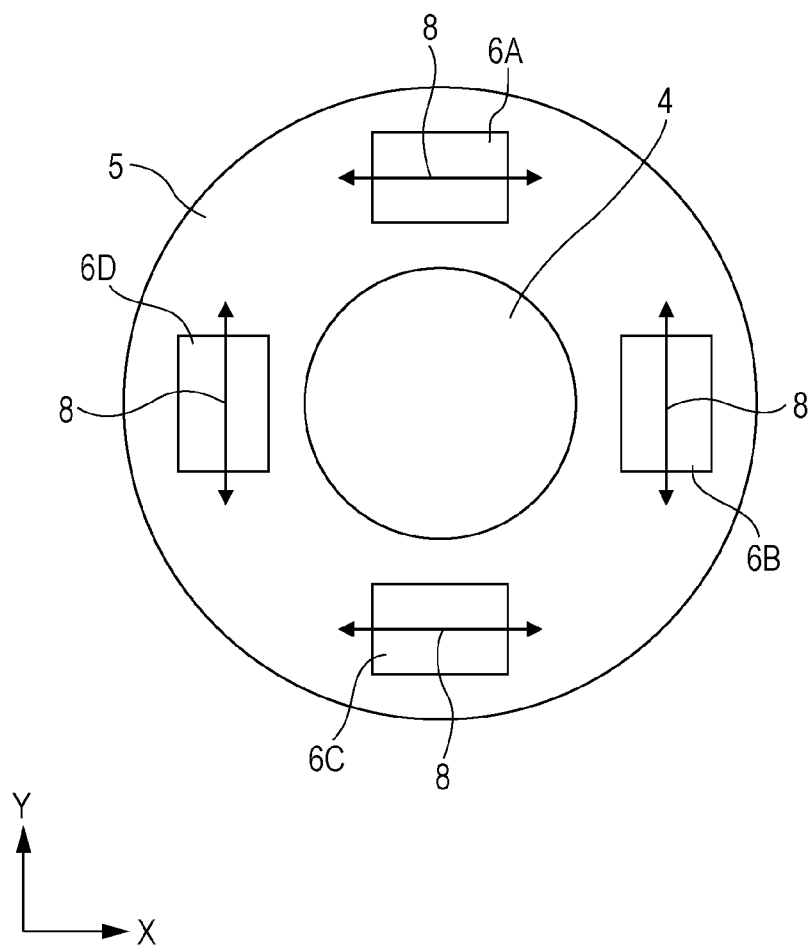
FIG. 2 illustrates an arrangement of a movable body and vibration-wave driving devices according to Example 1 of the present invention.

FIG. 2 illustrates an arrangement of the movable body 5 and the vibration-wave driving devices 6 as viewed from the image pickup element 7.

The movable body 5 is made of highly wear-resistant, heat-treated stainless steel and has an annular shape.

The optical lens 4 for image shake correction is held in the center of the movable body 5. The vibration-wave driving devices 6 are arranged outside the optical lens 4 in the radial direction so as not to interfere with the optical path.

Four vibration-wave driving devices 6 (6A, 6B, 6C, and 6D) are arranged at regular intervals in the circumferential direction.

When a vibration (described below) is excited in the vibration-wave driving devices 6, the movable body 5 pressed in contact with the vibration-wave driving devices 6 can be linearly driven forward and backward using a frictional force.

The driving direction of each of the vibration-wave driving devices 6 is indicated by arrow 8.

The driving direction of the vibration-wave driving devices 6A and 6C corresponds to the X direction in the drawing, whereas the driving direction of the vibration-wave driving devices 6B and 6D corresponds to the Y direction in the drawing.

These driving directions are orthogonal to each other. By combining their driving operations, the movable body 5 can be moved in different directions in two-dimensional space (i.e., in the XY plane).

In the present example, the vibration-wave driving devices 6 having driving directions orthogonal to each other allow the movable body 5 to move in different directions in two-dimensional space. As long as the vibration-wave driving devices 6 are arranged such that their driving directions intersect each other, the movable body 5 can be moved in two-dimensional space as in the present example.

Problems that arise when the related art described above is used in the present example will be described with reference to FIG. 2.

For example, if an image shakes in the X direction, the movable body 5 is moved in the X direction to compensate for the shake. In this case, the vibration-wave driving devices 6B and 6D, which have a driving direction in the Y direction, do not contribute to driving the movable body 5.

Also, since the movable body 5 is pressed in contact with the vibration-wave driving devices 6B and 6D, a frictional force is produced between them and interferes with the movement of the movable body 5 in the X direction.

Figure 4A:
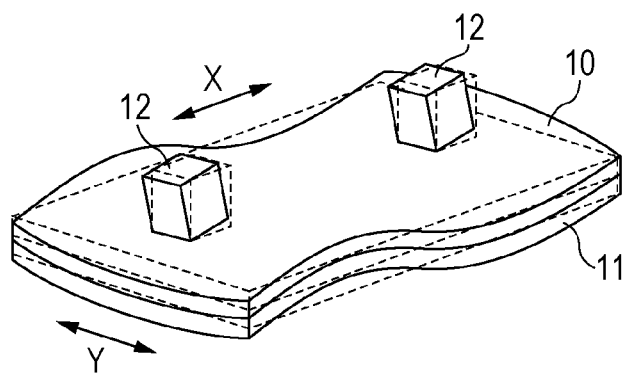
FIG. 4A illustrates a vibration mode of a vibrator in a vibration-wave driving device according to Example 1 of the present invention.
Figure 4B:
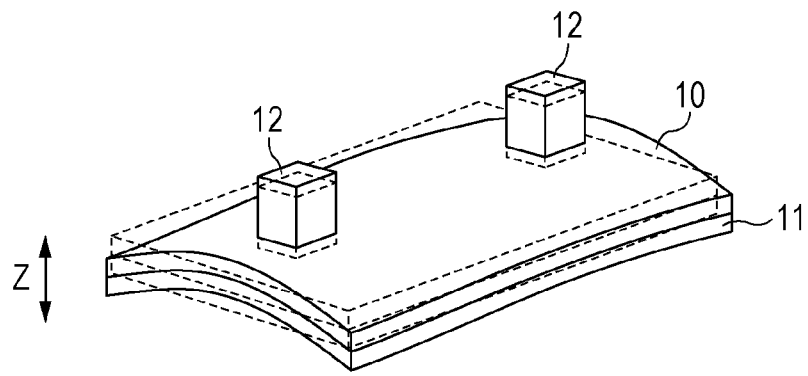
FIG. 4B illustrates another vibration mode of the vibrator in the vibration-wave driving device according to Example 1 of the present invention.

To reduce the level of this interference, a vibration is excited in a vibration mode where upper surfaces of protruding portions 12 illustrated in FIG. 4B vibrate in the direction of contact with the movable body 5 (i.e., in the Z direction).

To sufficiently reduce the frictional force, it is necessary to produce a large amplitude. This requires generation of a vibration having a large amplitude, and causes an increase in power consumption.

FIG. 1 is a perspective view of the vibration-wave driving devices 6A and 6C according to the present example. The coordinate system in the drawing is a rectangular coordinate system expressed in a right-handed system.

Reference numeral 9 denotes a vibrator having a rectangular plate-like shape. The vibrator 9 includes a vibrating plate 10 having two protruding portions 12, and a piezoelectric ceramic 11 serving as an electromechanical-energy converting element and secured to the vibrating plate 10. The vibrating plate 10 has beam portions and vibrator securing portions 13. The two protruding portions 12 are arranged side by side in the longitudinal direction of the vibrator 9.

Reference numeral 14 denotes a sleeve secured to the vibrator securing portion 13. Reference numeral 15 denotes a bar connected at one end thereof to the lens barrel 1. The lens barrel also serves as a securing member that secures a guide member.

The sleeves 14 are provided with holes through which the respective bars 15 pass. The sleeves 14 and the bars 15 combine together to form a guide member.

As used herein, a guide member refers to a member that allows movement in a specific direction and restrains movement in the other directions.

The vibrator 9 is movable in the longitudinal direction of the bars 15 (Y direction).

Grease is applied to contact surfaces of the sleeves 14 and the bars 15 to make the sliding resistance very small. The upper surfaces of the protruding portions 12 are in contact with the movable body 5.

A pressure that brings the bars 15 and the movable body 5 closer to each other in the Z direction in the drawing is applied by a coil spring (not shown).

Thus, the protruding portions 12 and the movable body 5 are pressed into contact with each other.

An alternating voltage from a power supply is applied to the piezoelectric ceramic 11 to excite vibrations in two different vibration modes in the vibrator 9. FIGS. 4A and 4B illustrate the two vibration modes.

The vibration mode illustrated in FIG. 4A is also referred to as A mode. The vibration mode illustrated in FIG. 4B is also referred to as B mode.

The vibration mode illustrated in FIG. 4A is a vibration mode (A mode) where the upper surfaces of the protruding portions 12 vibrate in the longitudinal direction of the vibrator 9 (also referred to as a feed direction, which is the X direction in the drawing).

The vibration mode illustrated in FIG. 4B is a vibration mode (B mode) where the upper surfaces of the protruding portions 12 vibrate in the direction of contact with the movable body 5 (also referred to as a push-up direction).

The alternating voltage is set such that the vibrations in the two vibration modes are excited with a time phase difference of about 90°.

This means that the time phase difference does not necessarily need to be exactly 90°, as long as a necessary vibration is obtained. Hereinafter, the term "about" in the present specification has a meaning similar to this.

Thus, the upper surfaces of the protruding portions 12 move along an elliptic path, and cause the movable body 5 in contact therewith to move in one direction, which is the X direction in FIG. 4A. That is, the driving direction of the vibrator 9 is a direction of a driving force produced by the vibrator 9 to move the movable body, and is the same direction as the feed direction.

If a phase difference between vibrations in the two vibration modes is about −90°, the movable body 5 can be moved in a direction opposite that described above.

This moving direction is a driving direction of the vibration-wave driving devices 6A and 6C illustrated in FIG. 2 (i.e., the first direction indicated by arrow 8).

The vibration-wave driving devices 6B and 6D have the same configuration as the vibration-wave driving devices 6A and 6C. As illustrated in FIG. 2, the vibration-wave driving devices 6B and 6D are arranged such that their driving direction is the Y direction in FIG. 2.

In the present example, the vibration-wave driving devices 6 each include a guide member formed by the sleeves 14 and the bars 15 in the direction (second direction) orthogonal to the driving direction (first direction).

Functions based on the configuration described above will now be described with reference to FIG. 2.

When the movable body 5 is moved in the X direction (i.e., in the first direction of the vibration-wave driving devices 6A and 6C) by a driving force of the vibration-wave driving devices 6A and 6C, the vibration-wave driving devices 6B and 6D move in the X direction (i.e., in the second direction of the vibration-wave driving devices 6B and 6D) in accordance with the movement of the movable body 5.

The movement of the vibration-wave driving devices 6B and 6D in the X direction (i.e., in the second direction of the vibration-wave driving devices 6B and 6D whose first direction is the Y direction) is not restrained and the resistance is practically negligible.

Therefore, since a force acting on the movable body 5 from the vibration-wave driving devices 6B and 6D in the X direction (i.e., in the second direction of the vibration-wave driving devices 6B and 6D) can be made substantially zero and does not interfere with the movement of the movable body 5, there is substantially no output loss.

That is, there is no need here to excite a vibration in the vibration mode (B mode) of FIG. 4B in the vibration-wave driving devices 6B and 6D, and a voltage applied to the electromechanical-energy converting element 11 can be reduced. Thus, the amount of power consumed for this can be reduced. The effect of reduction of power consumption is maximized when a voltage applied to the electromechanical-energy converting element 11 is zero.

Similarly, when the movable body 5 is moved in the Y direction (i.e., in the first direction of the vibration-wave driving devices 6B and 6D) by a driving force of the vibration-wave driving devices 6B and 6D, a force acting on the movable body 5 from the vibration-wave driving devices 6A and 6C in the Y direction (i.e., in the second direction of the vibration-wave driving devices 6A and 6C whose first direction is the X direction) can be made substantially zero. It is thus possible to make the output loss substantially zero, and reduce the power consumption.

Although the present example has described the case where the movable body 5 is driven in the X or Y direction in FIG. 2, the present invention is not limited to this.

For example, the present invention is also applicable to the case where the movable body 5 is moved in a direction at an angle between the X direction and the Y direction.

Even in this case, since the driving direction (first direction) of any of the vibration-wave driving devices 6 (6A, 6B, 6C, and 6D) intersects with the moving direction of the movable body 5, a frictional force component is produced in a direction (second direction) orthogonal to the driving direction.

However, with the configuration of the present invention, it is possible to reduce an output loss caused by the frictional force between the movable body 5 and the vibration-wave driving devices 6.

Although the present example uses only the vibration-wave driving devices 6 to move the movable body in two-dimensional space, one or more vibration-wave driving devices 6 may be replaced with one or more non-contact driving devices capable of transmitting the displacement or driving force to the movable body without contact. For example, when one voice coil motor and one vibration-wave driving device 6 are arranged to have different driving directions, it is still possible to move the movable body 5 in two-dimensional directions. In the case of FIG. 2, a two-dimensional driving apparatus is realized, which includes a vibration-wave driving device denoted by reference numeral 6A and a voice coil motor denoted by reference numeral 6B but does not include the components denoted by reference numerals 6C and 6D. In this case, when the movable body is moved in the Y direction in the drawing, a displacement or a driving force is produced in the voice coil motor 6B. The vibration-wave driving device 6A, which is in contact with the movable body, is subjected to a force from the movable body in the Y direction in the drawing. With the configuration of the present invention, where the vibration-wave driving device 6A can move in the Y direction, no reactive force is produced in the Y direction against the movable body and it is possible to reduce an output loss. Unlike the configuration of the present invention, if the vibration-wave driving device 6A is configured to be fixed in the Y direction, a reactive force is produced in the Y direction against the movable body and causes an output loss.

The image-shake correcting apparatus 3 is included in the lens barrel 1 in the example described above. The same effect as that of the present example can be achieved even when the image-shake correcting apparatus 3 is included in the camera body 2, or when the image pickup element in the camera body is configured to be movable.

The effect of the present invention can be achieved even when the shape of the vibrator 9 and the vibration modes are different from those described above.

The present example has described an image-shake correcting apparatus. The present invention may also be applied, for example, to a two-dimensional driving apparatus, such as a stage of a microscope for moving a sample. In this case, it is possible again to achieve the effect of the present invention, and realize a two-dimensional driving apparatus in which an output loss is reduced.

Example 2

Example 2 will describe a configuration different from that of Example 1 in terms of the configuration of the vibrator and the securing portions, and the configuration for holding the vibrator.

Figure 5A:
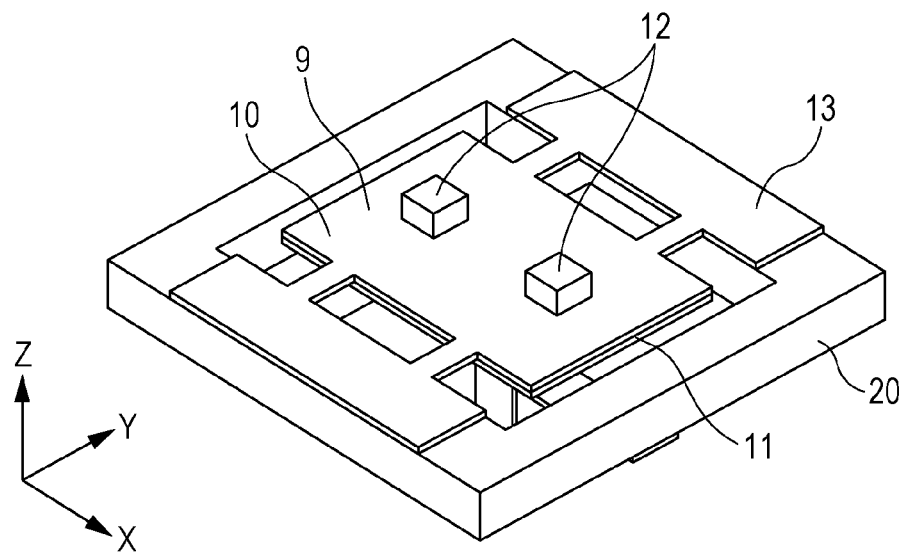
FIG. 5A is a perspective view illustrating a configuration of a vibration-wave driving device according to Example 2 of the present invention.

FIG. 5A is a perspective view of a vibration-wave driving device according to another example of the present invention, as viewed from the protruding portions 12.

Figure 5B:
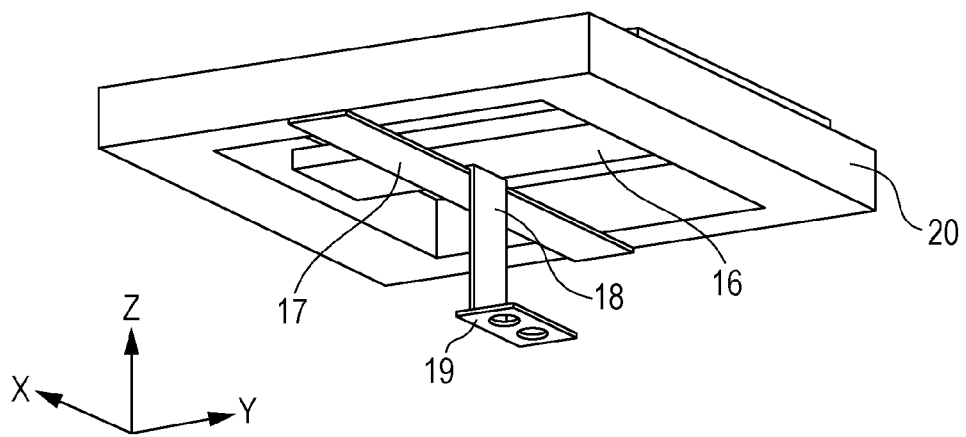
FIG. 5B is another perspective view illustrating the configuration of the vibration-wave driving device according to Example 2 of the present invention.

FIG. 5B is a perspective view of the vibration-wave driving device, as viewed from a side opposite the protruding portions 12. The coordinate system in the drawings is a rectangular coordinate system expressed in a right-handed system. A description will now be given using FIGS. 5A and 5B.

In the present example, a holder 20 is combined with the securing portions 13 for securing the vibrator 9. The holder 20 has a rectangular frame-like shape.

A spring 17, which is a plate-like elastic member, is attached to the holder 20. The holder 20 holds a magnet 16 in a space between the vibrator 9 and the spring 17.

The spring 17 is manufactured by sheet metal stamping, and is made of a spring material of stainless steel. A spring adoptable in the present invention is not limited to such a plate-like elastic member.

The spring 17 has a portion extending in the X direction in the drawing and secured to the holder 20, a Y deformation spring 18 extending from this portion in the Z direction in the drawing, and a securing portion 19 attached to the Y deformation spring 18. The securing portion 19 is secured to the lens barrel 1 (not shown).

The thickness direction of the Y deformation spring 18 is the Y direction in the drawing. A spring stiffness of the Y deformation spring 18 is smaller in the Y direction (second direction) and larger in the X direction (first direction).

When the movable body 5 (not shown), which is a magnetic body, is brought into contact with the protruding portions 12, the movable body 5 is pressed against the vibrator 9 by the magnet 16. When a predetermined alternating voltage is applied to the piezoelectric ceramic 11 as in Example 1, the movable body 5 can be driven in the X direction (first direction).

When the movable body 5 is driven in the Y direction (second direction) by another actuator, the Y deformation spring 18 having a spring stiffness smaller in the Y direction bends in the Y direction. This allows the vibrator 9 to move in the Y direction.

The amount of force applied from the vibrator 9 to the movable body 5 in the Y direction is obtained by multiplying the amount of movement of the vibrator 9 in the Y direction by the spring stiffness of the Y deformation spring 18 in the Y direction.

The spring stiffness can be easily reduced by reducing the thickness of the Y deformation spring 18, by narrowing the Y deformation spring 18, or by using a spring having a small spring stiffness. This can reduce a force that interferes with the movement of the movable body 5 in the Y direction.

Since the Y deformation spring 18 has a spring stiffness larger in the X direction, which is the driving direction of the vibration-wave driving device, the movable body 5 can be driven in the X direction without much loss of force.

Although Example 1 uses a guide member, the present example uses a leaf spring. This makes it possible to achieve the effect of the present invention with a simpler structure.

Example 3

Example 3 will describe a configuration different from that of Example 2 in that the spring 17 has two Y deformation springs 18 arranged in the Y direction (second direction) in the drawing and two securing portions 19 are attached to the respective Y deformation springs 18.

Figure 6:
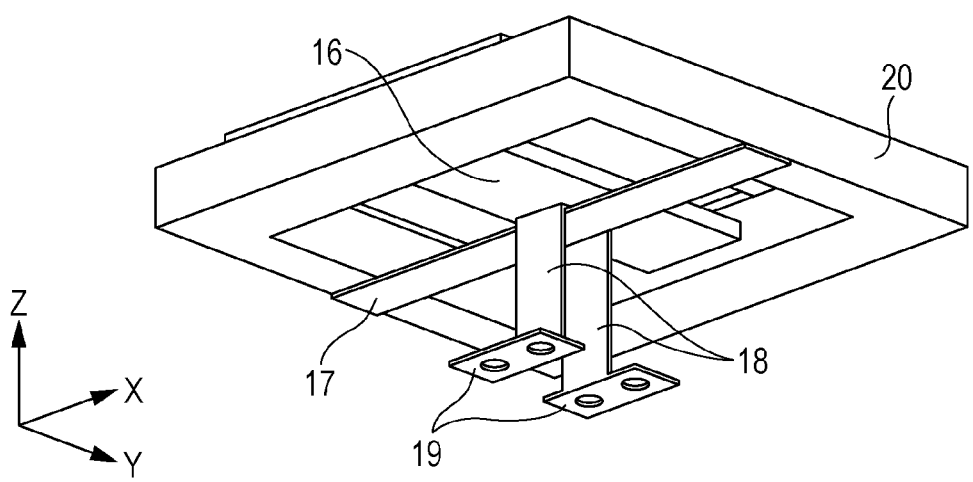
FIG. 6 is a perspective view illustrating a configuration of a vibration-wave driving device according to Example 3 of the present invention.

FIG. 6 is a perspective view of a vibration-wave driving device according to another example of the present invention, as viewed from a side opposite the protruding portions 12. The coordinate system in the drawing is a rectangular coordinate system expressed in a right-handed system.

In the present example, the two securing portions 19 are secured to the lens barrel 1 (not shown). This configuration provides an elastic parallel crank mechanism in the Y direction (second direction).

When the vibrator 9 is subjected to a force from the movable body 5 in the Y direction, a rotary motion of the vibrator 9 in the XZ plane is less likely to occur, so that the vibrator 9 mainly moves in the Y direction.

In the present example, as in Example 2, the Y deformation springs 18 have a thickness direction corresponding to the Y direction in the drawing (second direction), and have a spring stiffness smaller in the Y direction. This can reduce a force that interferes with the movement of the movable body 5 in the Y direction.

Also, since the spring stiffness of the Y deformation springs 18 is larger in the X direction (first direction), the movable body 5 can be driven in the X direction without much loss of force.

When the movable body 5 is driven to move in the Y direction by another actuator and the vibrator 9 moves in the Y direction, the elastic parallel crank mechanism described above makes a rotary motion of the vibrator 9 in the XZ plane less likely to take place.

This can reduce the amount of inclination of the protruding portions 12 of the vibrator 9 with respect to the movable body 5, and stabilize the contact between the protruding portions 12 and the movable body 5.

Example 4

Example 4 will describe a configuration different from that of Example 2 in that the longitudinal direction of the Y deformation spring 18 and the securing portion 19 of the spring 17 is the X direction, which is the driving direction (first direction) of the vibration-wave driving device.

Figure 7A:
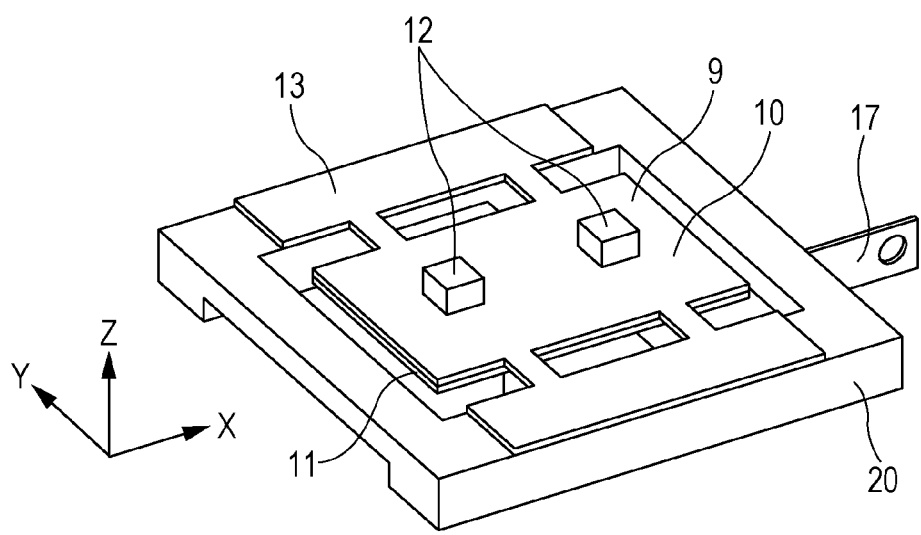
FIG. 7A is a perspective view illustrating a configuration of a vibration-wave driving device according to Example 4 of the present invention.

FIG. 7A is a perspective view of a vibration-wave driving device according to another example of the present invention, as viewed from the protruding portions 12.

Figure 7B:
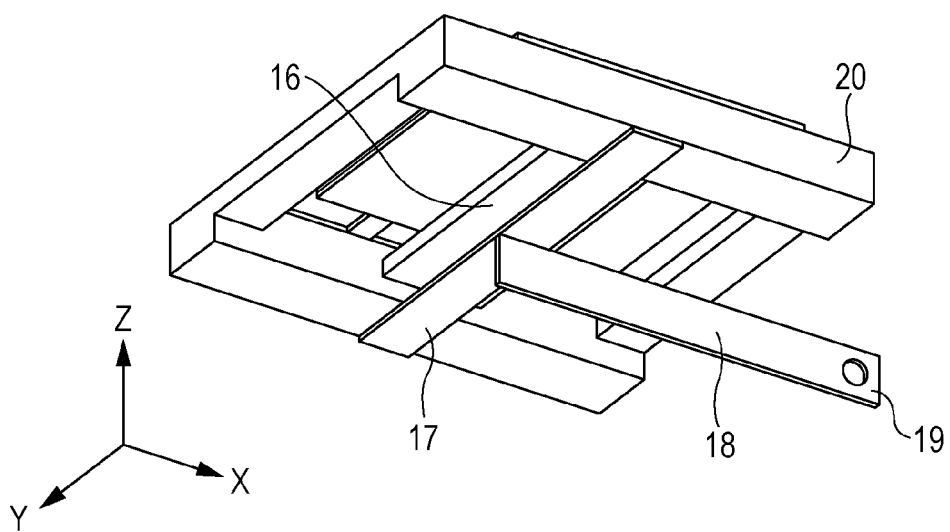
FIG. 7B is another perspective view illustrating the configuration of the vibration-wave driving device according to Example 4 of the present invention.

FIG. 7B is a perspective view of the vibration-wave driving device, as viewed from a side opposite the protruding portions 12. The coordinate system in the drawings is a rectangular coordinate system expressed in a right-handed system. A description will now be given using FIGS. 7A and 7B.

In the present example, as in Example 2, the thickness direction of the Y deformation spring 18 is the Y direction in the drawing (second direction) orthogonal to the driving direction of the vibration-wave driving device.

In the present example, as in Example 2, the Y deformation spring 18 has a thickness direction corresponding to the Y direction in the drawing, and has a spring stiffness smaller in the Y direction. This can reduce a force that interferes with the movement of the movable body 5 in the Y direction.

Also, since the spring stiffness of the Y deformation spring 18 is larger in the X direction, the movable body 5 can be driven in the X direction without much loss of force.

In the present example, where the longitudinal direction of the spring 17 is the X direction, a reduction in profile of the vibration-wave driving device can be achieved.

Example 5

Example 5 will describe a configuration different from that of Example 4 in that the spring 17 has two Y deformation springs 18 and two securing portions 19 arranged in the X direction, which is the driving direction of the vibration-wave driving device.

Figure 8A:
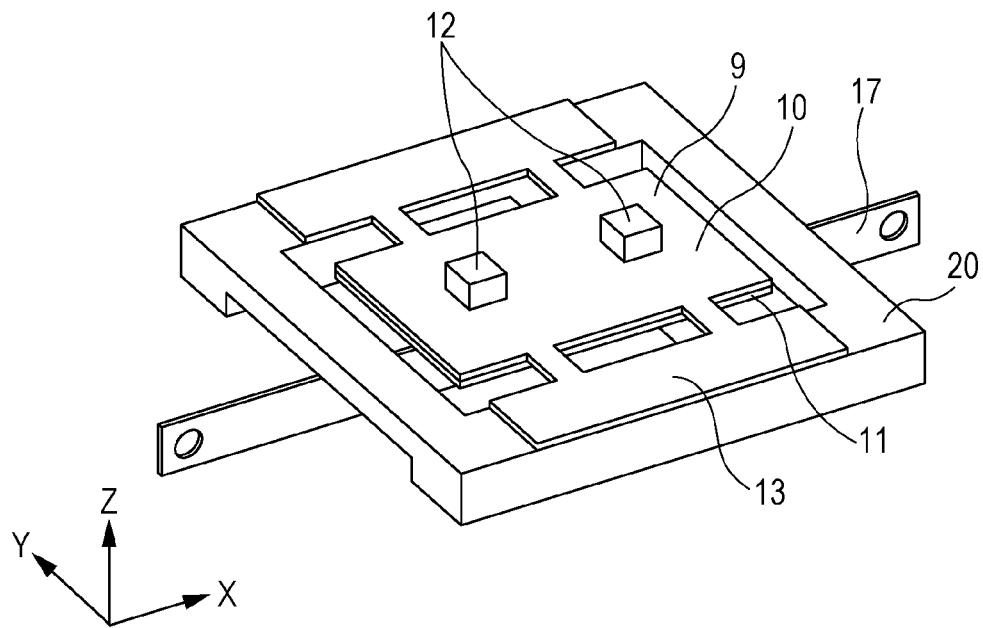
FIG. 8A is a perspective view illustrating a configuration of a vibration-wave driving device according to Example 5 of the present invention.

FIG. 8A is a perspective view of a vibration-wave driving device according to another example of the present invention, as viewed from the protruding portions 12.

Figure 8B:
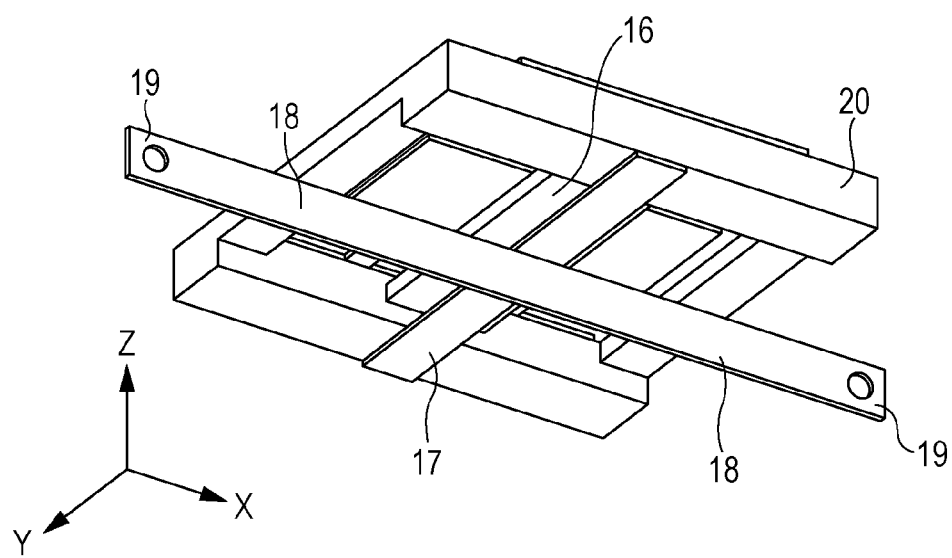
FIG. 8B is another perspective view illustrating the configuration of the vibration-wave driving device according to Example 5 of the present invention.

FIG. 8B is a perspective view of the vibration-wave driving device, as viewed from a side opposite the protruding portions 12. The coordinate system in the drawings is a rectangular coordinate system expressed in a right-handed system. A description will now be given using FIGS. 8A and 8B.

In the present example, as in Example 4, the thickness direction of the Y deformation springs 18 is the Y direction in the drawing (second direction) orthogonal to the driving direction (first direction) of the vibration-wave driving device.

In the present example, as in Example 4, the Y deformation springs 18 have a thickness direction corresponding to the Y direction in the drawing, and have a spring stiffness smaller in the Y direction (second direction).

This can reduce a force that interferes with the movement of the movable body 5 in the Y direction. Also, since the spring stiffness of the Y deformation springs 18 is larger in the X direction (first direction), the movable body 5 can be driven in the X direction without much loss of force.

When the movable body 5 is driven to move in the Y direction by another actuator and the vibrator 9 moves in the Y direction, a stiffness against rotation in the XY plane increases. This makes a rotary motion in the XY plane less likely to occur.

Therefore, it is possible to reduce the amount of rotation of the driving direction of the vibration-wave driving device in the XY plane in the drawing.

Example 6

Example 6 will describe a configuration different from that of Example 5 in that the spring 17 has two Y deformation springs 18 arranged in the Y direction in the drawings, which is orthogonal to the driving direction of the vibration-wave driving device, and one securing portion 19 common to the two Y deformation springs 18.

Figure 9A:
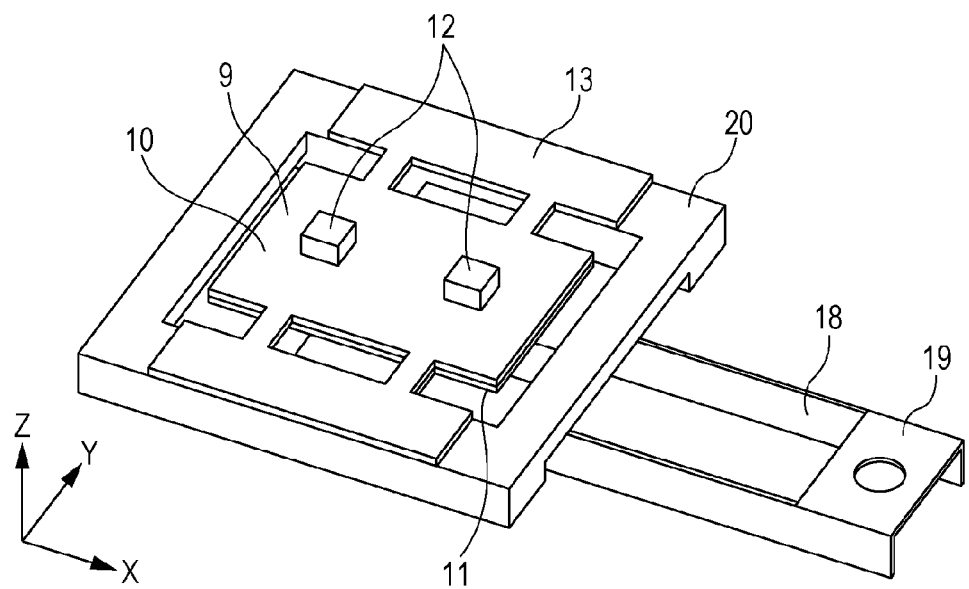
FIG. 9A is a perspective view illustrating a configuration of a vibration-wave driving device according to Example 6 of the present invention.

FIG. 9A is a perspective view of a vibration-wave driving device according to another example of the present invention, as viewed from the protruding portions 12.

Figure 9B:
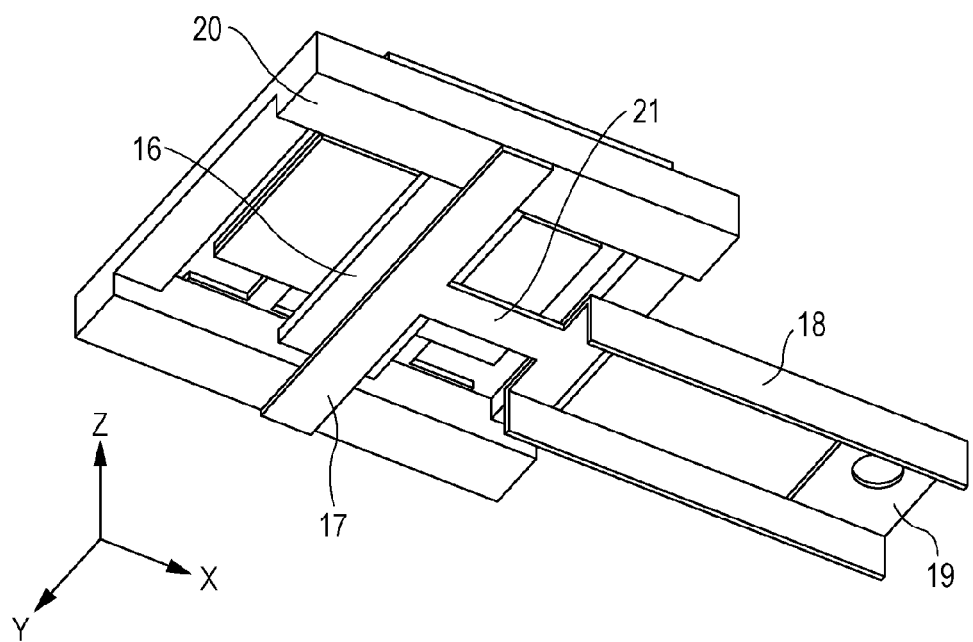
FIG. 9B is another perspective view illustrating the configuration of the vibration-wave driving device according to Example 6 of the present invention.

FIG. 9B is a perspective view of the vibration-wave driving device, as viewed from a side opposite the protruding portions 12. The coordinate system in the drawings is a rectangular coordinate system expressed in a right-handed system. A description will now be given using FIGS. 9A and 9B.

In Example 5 described above, the two Y deformation springs 18 are arranged in the X direction, which is the driving direction. In this case, if the vibrator 9 significantly moves in the Y direction (second direction), the Y deformation springs 18 are pulled in the longitudinal direction. This interferes with the movement of the vibrator 9 in the Y direction. If a certain amount of movement is required, the movement of the movable body 5 in the Y direction may be restricted.

On the other hand, in the present example, the two Y deformation springs 18 are arranged in the Y direction.

Even if the vibrator 9 significantly moves in the Y direction (second direction), it is possible to maintain the bent state of the Y deformation springs 18 and reduce the occurrence where the Y deformation springs 18 are pulled in the longitudinal direction.

The spring 17 of the present example has a shock-absorbing portion 21 having a thickness direction corresponding to the Z direction and a longitudinal direction corresponding to the X direction. The shock-absorbing portion 21 is configured to facilitate a rotational motion of the vibrator 9 in the YZ plane and the XZ plane, and a translational motion of the vibrator 9 in the Z direction.

Even if the vibration-wave driving device is secured to the movable body 5 (not shown) with errors with respect to the mounting positions in the directions described above, the upper surfaces of the protruding portions 12 can easily follow the surface shape of the movable body 5.

As in Example 5, the thickness direction of the Y deformation springs 18 is the Y direction in the drawings (second direction) orthogonal to the driving direction (first direction) of the vibration-wave driving device.

In the present example, as in Example 5, the Y deformation springs 18 have a thickness direction corresponding to the Y direction in the drawing, and have a spring stiffness smaller in the Y direction. This can reduce a force that interferes with the movement of the movable body 5 in the Y direction.

Also, since the spring stiffness of the Y deformation springs 18 is larger in the X direction (first direction), the movable body 5 can be driven in the X direction without much loss of force.

Example 7

Figure 12:
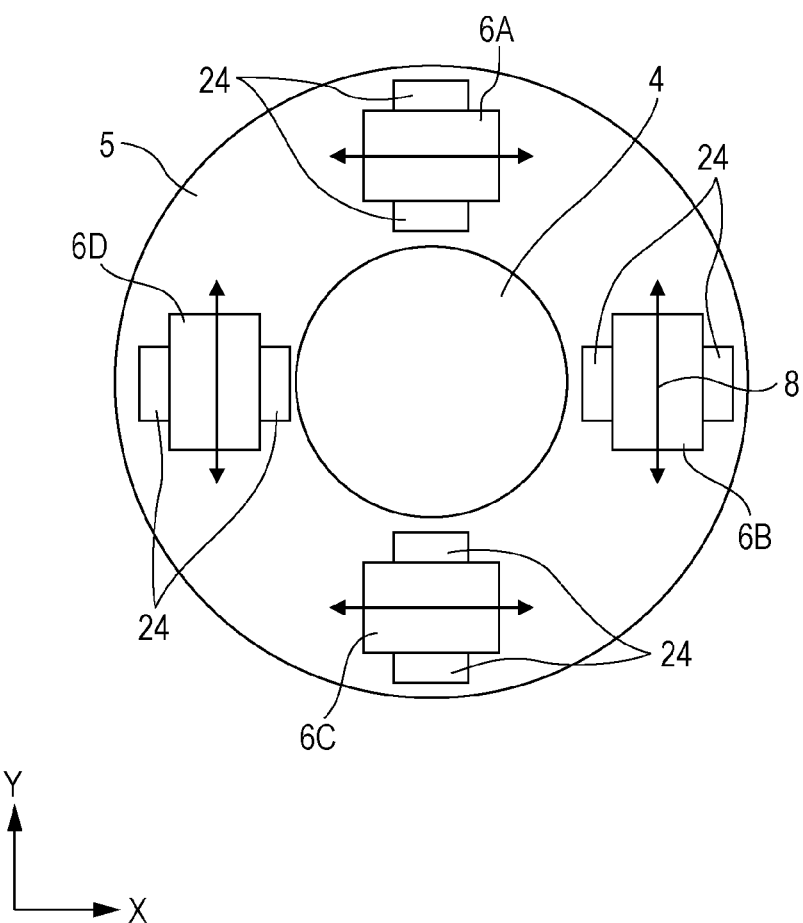
FIG. 12 illustrates an arrangement of a movable body and vibration-wave driving devices according to Example 7 of the present invention.

With reference to FIG. 12, Example 7 will describe a configuration different from that of Example 1 in that limiting members 24 are provided.

FIG. 12 illustrates an arrangement of the movable body 5 and the vibration-wave driving devices 6, as viewed from the image pickup element 7 in FIG. 3.

As illustrated in FIG. 12, the limiting members 24 of the present example are in the shape of a rectangular parallelepiped and are secured to the movable body 5.

Each of the vibration-wave driving devices 6 (6A, 6B, 6C, and 6D) have two limiting members 24. The sleeves 14 to which the vibrator 9 is secured are interposed between the two limiting members 24 in the direction (second direction) orthogonal to the driving direction 8 (first direction). In the vibration-wave driving device 6A, side surfaces of the sleeves 14 extending in the X direction and side surfaces of the limiting members 24 extending in the X direction form a guide in the X direction.

This allows a relative movement of the vibrator 9 and the sleeves 14 with respect to the movable body 5 in the driving direction 8 (X direction) while limiting the amount of relative movement in the Y direction orthogonal to the driving direction 8.

Similarly, the other vibration-wave driving devices 6 (6B, 6C, and 6D) each allow a relative movement of the vibrator 9 and the sleeves 14 with respect to the movable body 5 in the driving direction 8 while limiting the amount of relative movement in the direction orthogonal to the driving direction 8.

The function of the limiting members 24 will now be described.

The driving direction 8 of the vibration-wave driving device 6A is the X direction. Generally, a relative movement of the movable body 5 and the vibrator 9 does not occur in the Y direction.

In this case, when a desired amount of movement is given to the movable body 5, the amount of movement of the vibrator 9 and the sleeves 14 with respect to the bars 15 in the Y direction coincides with the desired amount of movement of the movable body 5.

However, due to disturbance or displacement in the driving direction caused by assembly errors or the like, a relative movement of the movable body 5 and the vibrator 9 may occur in the Y direction due to sliding between them.

In this case, the amount of movement of the vibrator 9 and the sleeves 14 with respect to the bars 15 in the Y direction is obtained by adding the amount of relative movement caused by sliding between the movable body 5 and the vibrator 9 to the desired amount of movement of the movable body 5. If such a relative movement caused by sliding repeatedly occurs, the amount of relative movement between the movable body 5 and the vibrator 9 and the sleeves 14 in the Y direction may increase.

If this amount of relative movement is too large, the resulting contact in the guide member formed by the sleeves 14 and the bars 15 causes an unnecessary force that changes the position of the vibrator 9 to act on the vibrator 9. This may cause unstable contact between the movable body 5 and the vibrator 9.

In the present example, the amount of relative movement between the movable body 5 and the vibrator 9 and the sleeves 14 in the Y direction is limited by the limiting members 24.

This can limit the amount of movement of the vibrator 9 and the sleeves 14 with respect to the bars 15 in the Y direction, and solve the problem described above.

The same effect is also achieved in the other vibration-wave driving devices (6B, 6C, and 6D).

The limiting members 24 are also effective in the vibration-wave driving device 6 using the Y deformation spring 18 described in any of Examples 2 to 6.

The present example will describe the case where side surfaces of the limiting members 24 and side surfaces of the holder 20 to which the vibrator 9 is secured form a guide in a direction orthogonal to the driving direction.

When a desired amount of movement is given to the movable body 5, the Y deformation spring 18 is displaced by an amount obtained by adding the amount of relative movement caused by sliding between the movable body 5 and the vibrator 9 in the Y direction to the amount of movement given to the movable body 5.

If the amount of relative movement caused by sliding in the Y direction increases, a deformation reaction force of the Y deformation spring 18 increases, which increases a force that interferes with the movement of the movable body 5 in the Y direction.

If the Y deformation spring 18 deforms to a degree that may lead to plastic deformation, work hardening may further increase the force that interferes with the movement of the movable body 5 in the Y direction.

In the present example, where the limiting members 24 are provided to limit the amount of relative movement of the vibrator 9 with respect to the movable body 5 in the Y direction, it is possible to achieve an effect of reducing the deformation of the Y deformation spring 18.

In the present example described above, a limiting mechanism that limits the amount of relative movement of the vibrator 9 with respect to the movable body 5 in a direction orthogonal to the driving direction is formed by the limiting members 24 and the sleeves 14, or by the limiting members 24 and the holder 20. However, the configuration of the limiting mechanism is not limited to this. For example, the limiting mechanism may be formed by the bars and the sleeves. Alternatively, the movable body 5 may be provided with a recessed portion having a groove extending along the driving direction of each vibration-wave driving device 6, so that the recessed portion and side surfaces of the protruding portions 12 of the vibrator 9 form a sliding guide.

As described above, the limiting mechanism may have any configuration, as long as it is capable of limiting the amount of relative movement of the vibrator 9 with respect to the movable body 5 in a direction orthogonal to the driving direction.

Example 8

Example 8 will describe a configuration different from those of Examples 1 to 7 which use a guide member or a leaf spring.

The present invention is not limited to the configuration in which a guide member or a leaf spring is used as in Examples 1 to 7.

Figure 10A:
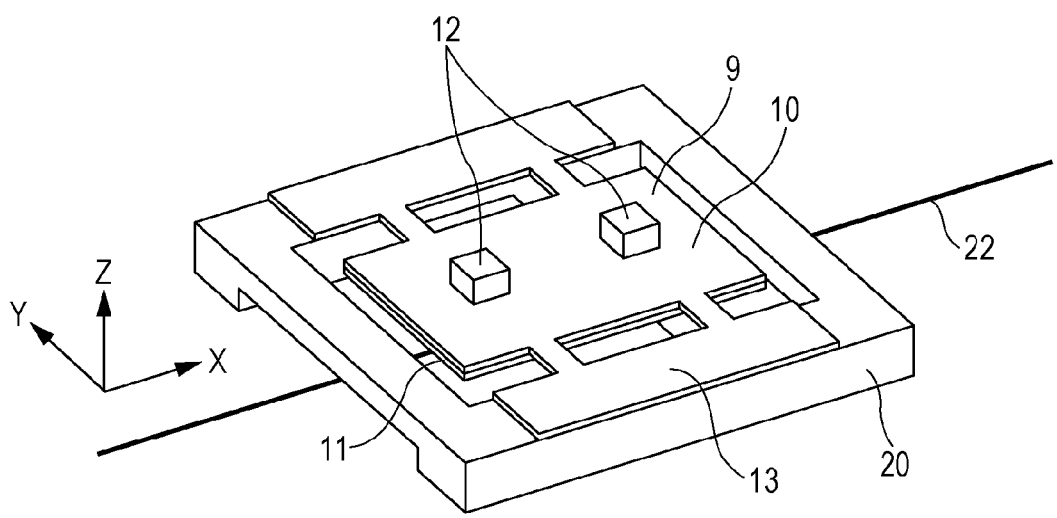
FIG. 10A is a perspective view illustrating a configuration of a vibration-wave driving device according to Example 8 of the present invention.
Figure 10B:
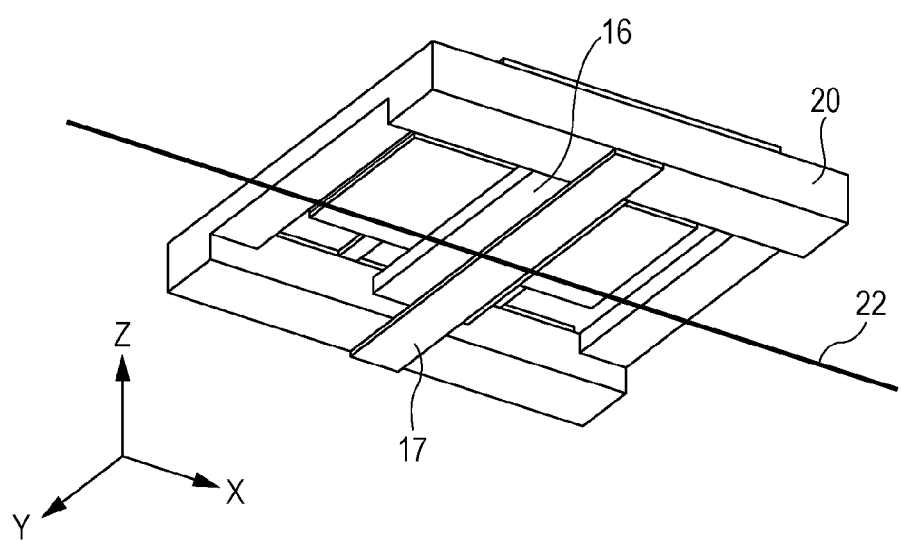
FIG. 10B is another perspective view illustrating the configuration of the vibration-wave driving device according to Example 8 of the present invention.

For example, as illustrated in FIGS. 10A and 10B, a round rod 22 with a small diameter may be placed on the spring 17 in the X direction in the drawings, which is the driving direction of the vibration-wave driving device, and secured at both ends thereof to the lens barrel 1 (not shown). The coordinate system in the drawings is a rectangular coordinate system expressed in a right-handed system.

This configuration facilitates a rotary motion of the vibrator 9 about the round rod 22 serving as the axis. When the movable body 5 is moved in the Y direction (second direction) by another actuator, the vibrator 9 rotates to allow the upper surfaces of the protruding portions 12 to move in the Y direction, so as not to interfere with the movement of the movable body 5.

Figure 11A:
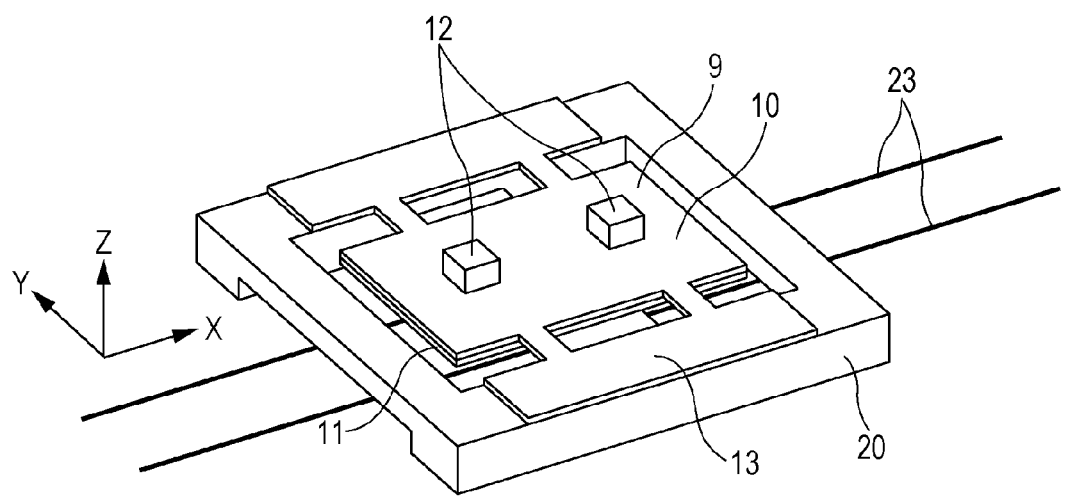
FIG. 11A is a perspective view illustrating another configuration of the vibration-wave driving device according to Example 8 of the present invention.
Figure 11B:
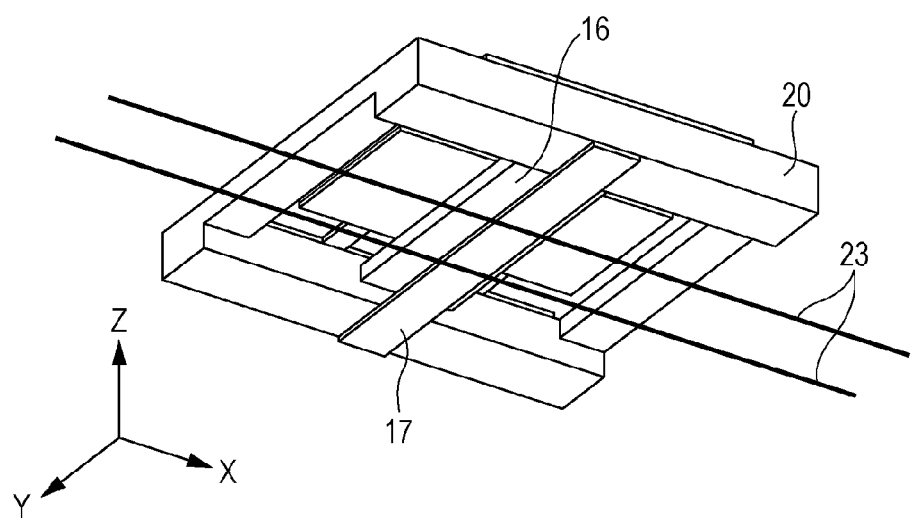
FIG. 11B is another perspective view illustrating the configuration of the vibration-wave driving device according to Example 8 of the present invention.

Alternatively, as illustrated in FIGS. 11A and 11B, two wires 23 may be placed on the spring 17 in the X direction in the drawings, and secured at both ends thereof to the lens barrel 1 (not shown).

The coordinate system in the drawings is a rectangular coordinate system expressed in a right-handed system. With this configuration, by adjusting a tension particularly on the two wires 23, a stiffness against the movement of the vibrator 9 in the Y direction (second direction) can be easily adjusted.

In the examples described above, the vibrator 9 can easily move in the Y direction. Therefore, when the movable body 5 is moved in the Y direction by another actuator, there is no interference with the movement of the movable body 5.

As components that contribute to achieving the effect of the present invention, the protruding portions 12 of the vibrator 9 in contact with the movable body 5 do not necessarily need to have a protruding shape.

The upper surfaces of the protruding portions 12 do not necessarily need to be in contact with the movable body 5. For example, end portions of the protruding portions 12 may be chamfered so that the chamfered inclined faces are in contact with the movable body 5, or the end portions of the protruding portions 12 may be rounded.

To help understand the description, the main deforming direction of the Y deformation spring has been described as the Y direction orthogonal to the X direction in each drawing. However, even if the main deforming direction of the Y deformation spring is a direction intersecting with the X direction, the effect of the present invention can be achieved as long as there is a directional component which allows the Y deformation spring to move in the Y direction when it deforms.

Example 9

Example 9 will describe a configuration different from that of Example 1 in terms of the configuration of the guide member.

Figure 13A:
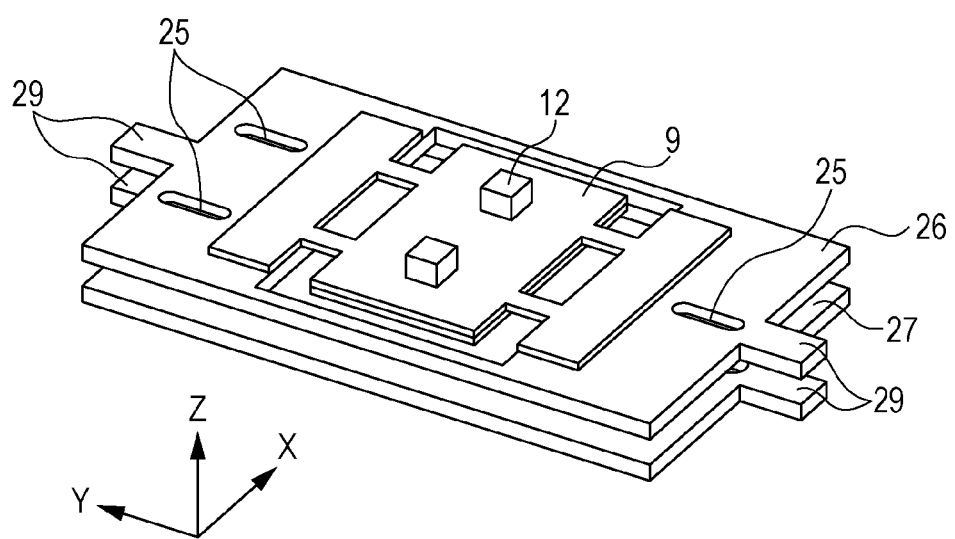
FIG. 13A is a perspective view illustrating a configuration of a vibration-wave driving device according to Example 9 of the present invention.

FIG. 13A is a perspective view of a vibration-wave driving device according to another example of the present invention, as viewed from the protruding portions 12.

Figure 13B:
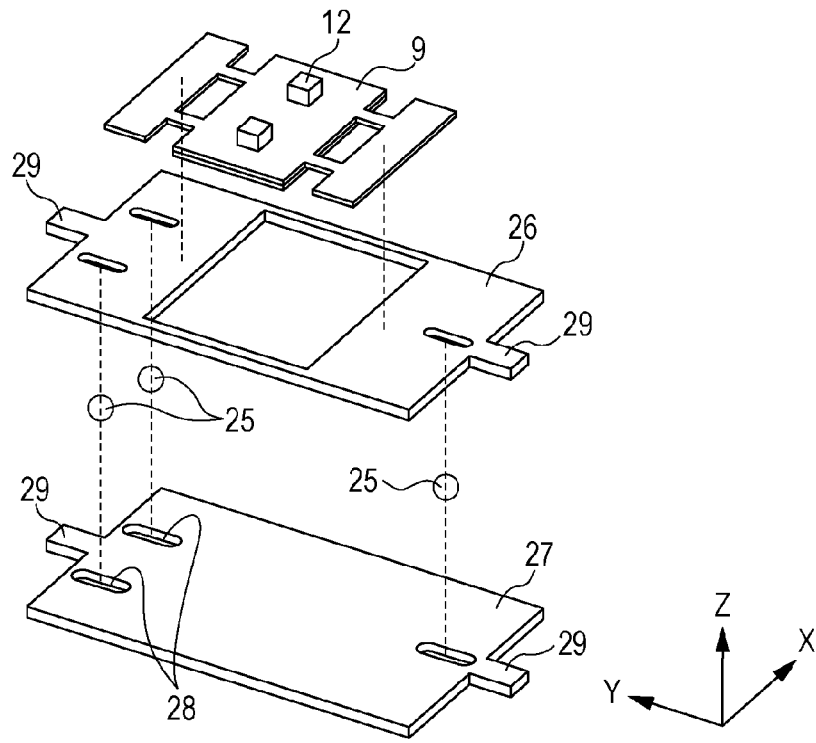
FIG. 13B is another perspective view illustrating the configuration of the vibration-wave driving device according to Example 9 of the present invention.
Figure 13C:
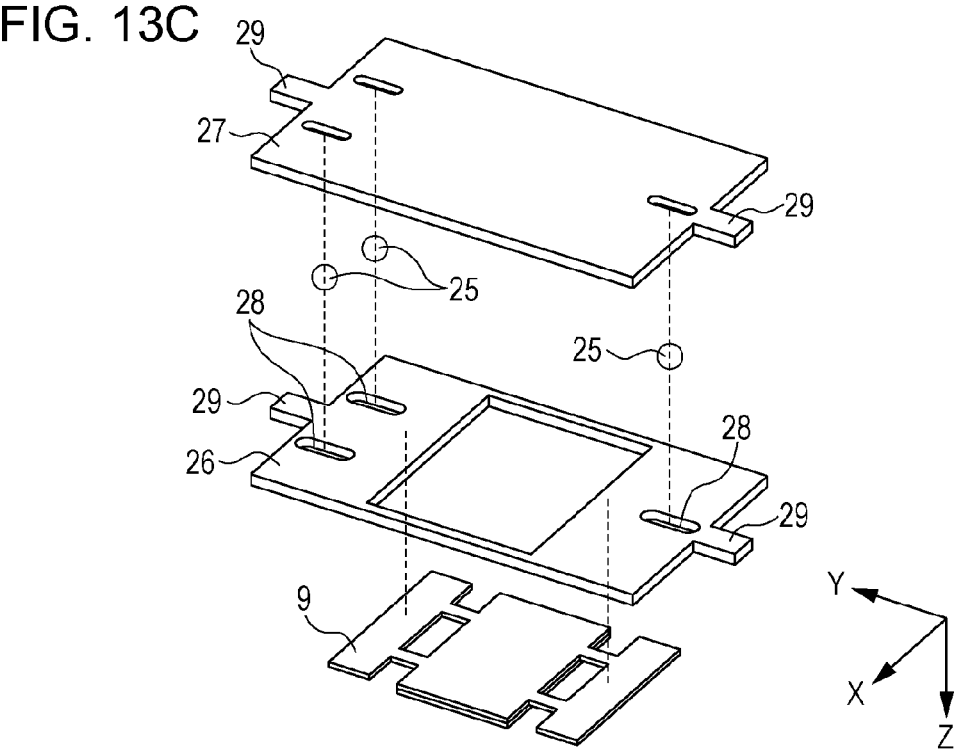
FIG. 13C is another perspective view illustrating the configuration of the vibration-wave driving device according to Example 9 of the present invention.

FIGS. 13B and 13C are diagrams illustrating an arrangement of components of the vibration-wave driving device. The components are shifted in the Z direction in the drawings. Each broken line indicates a portion where the corresponding components are to be in contact with each other.

FIG. 13B is a perspective view as viewed from the protruding portions 12.

FIG. 13C is a perspective view as viewed from a side opposite the protruding portions 12. The coordinate system in the drawings is a rectangular coordinate system expressed in a right-handed system. A description will now be given using FIGS. 13A to 13C.

In the present example, reference numeral 25 denotes a spherical ceramic ball having a rollable curved portion. Reference numerals 26 and 27 each denote a plate-like rail member. The rail members 26 and 27 each have three grooves 28.

The longitudinal direction of the grooves 28 is the Y direction (second direction). Ridges of the grooves 28 are chamfered. The rail members 26 and 27 each have spring attachment portions 29, to each of which a tension coil spring (not shown) is attached.

The arrangement of components will now be described.

The rail member 27 (fixed side) is secured to the lens barrel 1. The ceramic balls 25 are in contact with the chamfered inclined faces of the grooves 28 of the rail member 27 (fixed side).

The chamfered inclined faces of the grooves 28 of the rail member 26 (movable side) are in contact with the ceramic balls 25. The rail member 27 (fixed side), the ceramic balls 25, and the rail member 26 (movable side) are in contact with each other at three different points.

For application of a tensile force, a tension coil spring (not shown) is attached between the corresponding spring attachment portions of the rail members 26 and 27 facing each other. A guide member is realized by this configuration. The vibrator 9 is secured to the rail member 26.

The operation of the guide member will now be described.

The ceramic balls 25, which are spherical in shape, are capable of rolling and moving relatively in the Y direction in the drawings (second direction) along the grooves 28 of the rail member 27 (fixed side).

Similarly, the ceramic balls 25 are capable of rolling and moving in the Y direction in the drawings (second direction) relative to the rail member 26 (movable side).

The combination of these relative movements allows the rail member 26 (movable side) to move relative to the rail member 27 (fixed side) in the Y direction in the drawings (second direction).

In other words, since the rail member 27 (fixed side) is secured to the lens barrel 1 and the vibrator 9 is secured to the rail member 26 (movable side), the vibrator 9 is movable relative to the lens barrel 1 in the Y direction in the drawings (second direction).

The sliding resistance, which is caused by rolling friction here, is very small.

Next, the function of the guide member of the present example will be described.

The same effect as that of Example 1 will be described. The movable body (not shown) is pressed into contact with the protruding portions 12 of the vibrator 9 by pressing means (not shown).

When the movable body is moved by another actuator with respect to the lens barrel 1 in the Y direction in the drawings (second direction), a frictional force acts on the vibrator 9 and the movable body in the Y direction in the drawings (second direction). The guide member described above allows the vibrator 9 to move with respect to the lens barrel 1, with very small sliding resistance, in the Y direction in the drawings (second direction).

Thus, as in Example 1, when the movable body moves in the Y direction in the drawings (second direction), a force applied from the vibration-wave driving device to the movable body in the Y direction in the drawings (second direction) can be made very small. Therefore, there is no interference with the movement of the movable body, and it is possible to make the output loss substantially zero.

The guide mechanism regulates the degree of translational freedom in directions other than the Y direction in the drawings (second direction), that is, regulates the degree of translational freedom in the X direction, the degree of translational freedom in the Z direction, and the degree of rotational freedom around the X axis, the Y axis, and the Z axis.

Effects to be added, by the above-described configuration, to the effect of Example 1 will now be described.

In the present example, all the components of the guide member can be manufactured at low cost. This means that the guide member can be made at low cost.

The manufacturing process of the ceramic balls 25, which have been used as bearings, is industrially matured. This allows the ceramic balls 25 to be manufactured at low cost. Even if a ferrous material is used to form the ceramic balls 25, it is still possible to manufacture the ceramic balls 25 at low cost.

The rail members can be manufactured at low cost by stamping a plate-like material. The process for manufacturing tension coil springs is also industrially matured, so that the tension coil springs can be manufactured at low cost.

Another effect to be added to that of Example 1 is improved accuracy of driving the movable body. In Example 1, there is a very small clearance between the sleeve 14 and each bar 15 in the driving direction of the vibration-wave driving device (first direction).

On the other hand, in the present example, where the rail member 26 (movable side), the ceramic balls 25, and the rail member 27 (fixed side) are pressed in contact with one another by the tension coil springs, there is no clearance in the guide member in the driving direction of the vibration-wave driving device (first direction). This makes it possible to drive the movable body with higher accuracy.

The present example uses rolling of the ceramic balls 25. With a member having a rollable curved portion, it is possible to use its rolling motion and realize a guide member with very small sliding resistance.

Figure 14A:
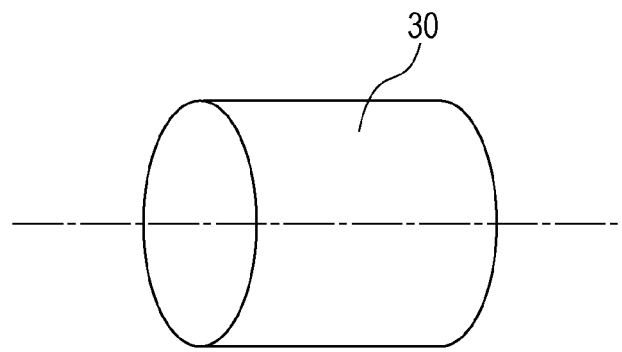
FIG. 14A illustrates a member having a rollable curved portion according to Example 9 of the present invention.
Figure 14B:
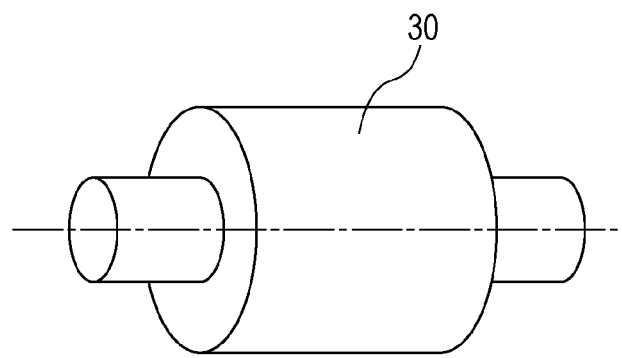
FIG. 14B illustrates another member having a rollable curved portion according to Example 9 of the present invention.
Figure 15:
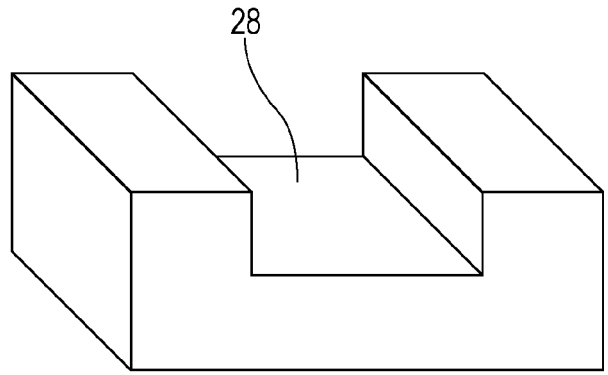
FIG. 15 illustrates a rail member having an angular U-shaped groove according to Example 9 of the present invention.

For example, a cylindrical member having a contact surface 30 (see FIGS. 14A and 14B) in contact with a rail member may be combined with the rail member having an angular U-shaped groove 28 (see FIG. 15) to form a guide member.

With this configuration, which allows line contact of a cylindrical surface with a flat surface, the contact area is greater than that in the present example where a ball is in point contact with a flat surface. This makes it possible to improve resistance to wear caused by sliding.

Although a ceramic ball is used as a member having a rollable curved portion, a guide member with very small sliding resistance can be realized regardless of the material of the member having a rollable curved portion.

The present invention can realize a vibration-wave driving device, a two-dimensional driving apparatus, and an image-shake correcting apparatus that can, when a movable body is moved in different directions in two-dimensional space, reduce an output loss caused by a vibration-wave driving device that does not contribute to the movement of the movable body, and be driven without causing an increase in power consumption.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A driving apparatus comprising:
   a vibration-wave driving device comprising a vibrator comprising an electromechanical-energy converting element, the vibration-wave driving device being configured to drive a driven body in a first direction;
   a driving device configured to drive the driven body in a second direction which intersects with the first direction;
   a first moving mechanism comprising a guide member which is configured to allow the vibration-wave driving device to move in the second direction; and
   a second moving mechanism configured to allow the driving device to move in the first direction, and
   wherein the guide member includes a member having a rollable curved portion,
   wherein the first direction is in a plane parallel to a plane where the vibrator and the movable body are in contact,
   wherein the second direction is in a plane parallel to a plane where the vibrator and the movable body are in contact.

2. The driving apparatus according to claim 1, wherein the member having the rollable curved portion is spherical or cylindrical in shape.

3. The driving apparatus according to claim 1 further comprising a limiting mechanism configured to limit an amount of relative movement of the vibrator and the movable body in the second direction.

4. The driving apparatus according to claim 1
   wherein the driven body is two-dimensionally moved by the vibration-wave driving device and the driving device.

5. The driving apparatus according to claim 1, wherein the driving device is a vibration-wave driving device comprising a vibrator comprising an electromechanical-energy converting element.

6. The driving apparatus according to claim 1, wherein the first direction is orthogonal to a driving direction of the driving device.

7. An image-shake correcting apparatus comprising:
   the driving apparatus according to claim 1;
   an optical lens or an image pickup element mounted on the driving apparatus;
   a control device; and
   a power supply,
   wherein the control device is configured to operate the power supply, and
   wherein a voltage from the power supply is applied to the electromechanical-energy converting element.

8. A lens barrel comprising:
   an optical lens; and
   the movable body according to claim 1,
   wherein the movable body holds the optical lens.

* * * * *